Jan. 10, 1967  G. K. MULHOLLAND ETAL  3,297,112
CASTER WHEEL AND BRAKE ASSEMBLY
Filed Sept. 24, 1964                    2 Sheets-Sheet 1

INVENTORS
GEORGE K. MULHOLLAND
JOHN C. TAYLOR
BY

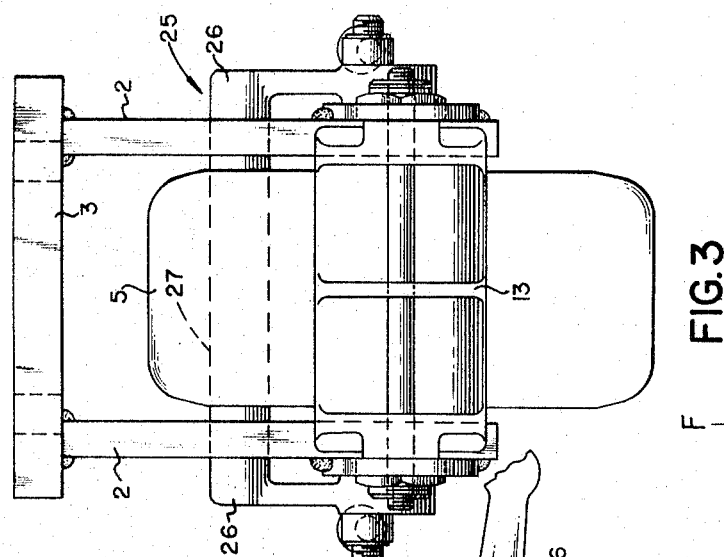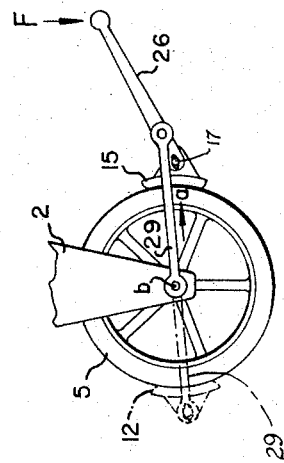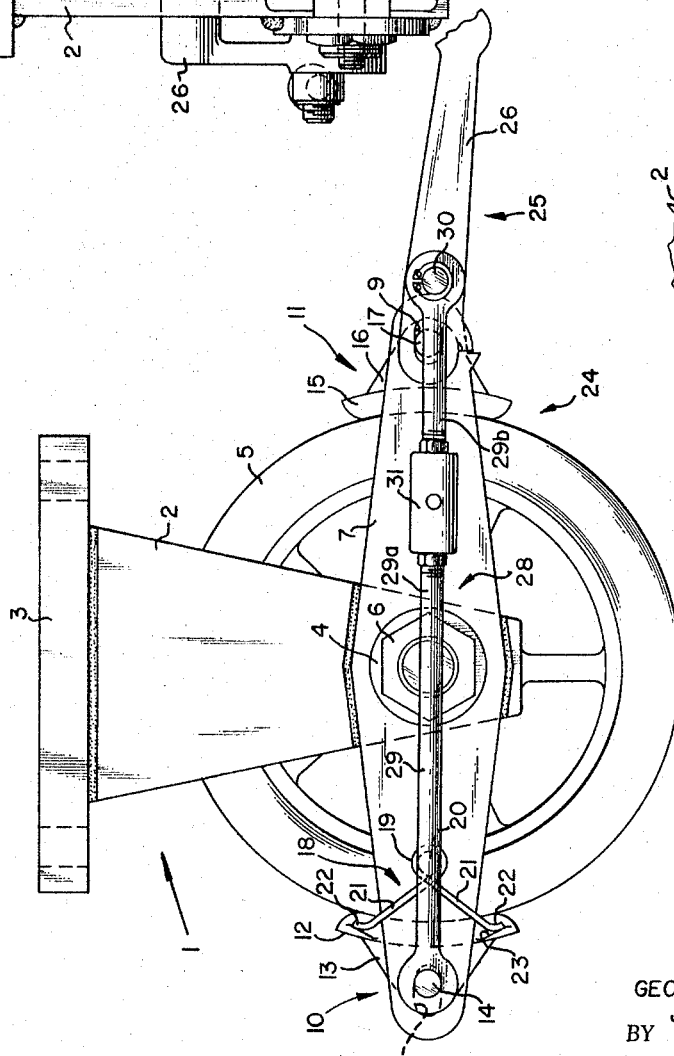

United States Patent Office 3,297,112
Patented Jan. 10, 1967

3,297,112
CASTER WHEEL AND BRAKE ASSEMBLY
George Keith Mulholland and John C. Taylor, Saginaw, Mich., assignors to Saginaw Products Corporation, Saginaw, Mich., a corporation of Michigan
Filed Sept. 24, 1964, Ser. No. 398,878
17 Claims. (Cl. 188—75)

This invention relates to a caster wheel and brake assembly and more particularly to a manually operable brake construction which is especially adapted for utilization on trucks of the general utility class such as those having swivelable or castering wheels.

Apparatus of the class to which the invention relates is particularly adapted for use on general utility trailers or trucks of the kind such as are utilized for ground transportation of freight and other cargo at airports, both civilian and military. Such trucks or trailers must be capable of supporting loads in the range of 10,000 pounds and be capable of being towed or driven at reasonable speeds over reasonably level terrain. It is not uncommon, however, to encounter ramps and other inclined areas at airports and over which the trucks or trailers must be moved. Moreover, the occasion frequently arises when a truck or trailer must be parked on an incline. As a result, it is common for such trucks or trailers to be equipped with brakes which may be set so as to enable a truck to be parked on an incline with no risk of its running unattended down the incline.

It has been customary heretofore to provide trucks of the kind mentioned with brakes, but not all of such brakes have been altogether acceptable for two major reasons: Firstly, brakes capable of meeting the standards prescribed for a fully loaded vehicle have had to be of a rather expensive construction such as disk or expanding drum type constructions, for example. Secondly, brakes of relatively simpler and less expensive construction were inadequate and incapable of performing the function for which they were intended.

An object of this invention is to provide a brake assembly for wheeled vehicles which overcomes the disadvantages of previously known assemblies for similar purposes. The dual brake system which will be described is of relatively inexpensive construction and yet provides twice the braking force of similar prior brakes.

A further object of the invention is to provide a brake assembly of the character referred to wherein the application and the release of the braking members is quick and positive and wherein it is practically impossible for the brakes, after once having been set, inadvertently to be released.

Another object of the invention is to provide a brake assembly which is adaptable for use on both castering and fixed wheel constructions.

A further object of the invention is to provide a brake assembly of the character described which is simple in operation and reliable in use.

Other objects and advantages of the invention will be pointed out specifically or will become apparent from the following description when it is considered in conjunction with the appended claims and the accompanying drawings, in which:

FIGURE 3 is an elevational view of the other end of the assembly;

FIGURE 4 is a view similar to FIGURE 1, but illustrating the brake in its applied position; and FIGURE 5 is a schematic side elevational view illustrating how the present construction achieves twice the braking capacity.

Figures 1, 2:
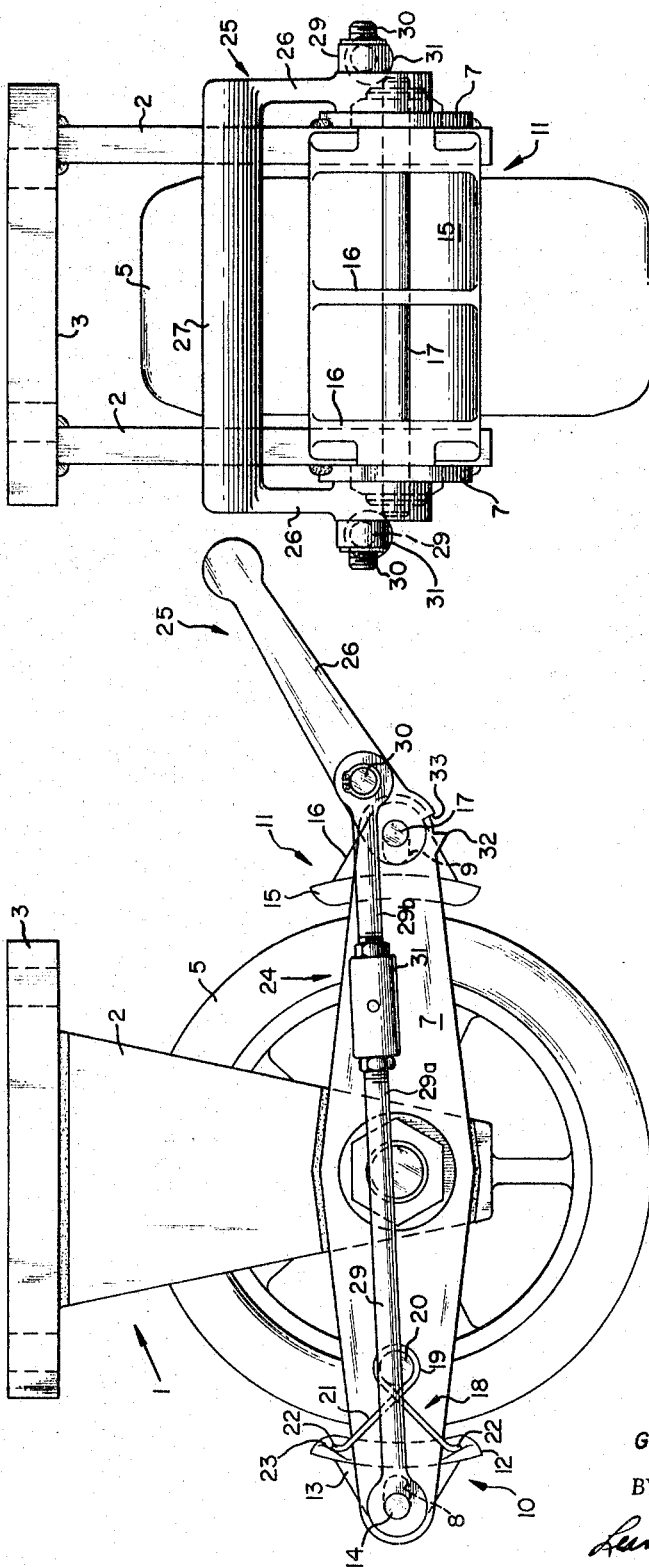
FIGURE 1 is a side elevational view of a wheel and brake assembly constructed in accordance with the invention, the brake being illustrated in its released position.
FIGURE 2 is an elevational view of one end of the assembly shown in FIGURE 1.

Apparatus constructed in accordance with the invention comprises a forked support 1 which preferably includes a pair of parallel plates 2 that may be welded or otherwise secured in spaced apart relation to a cross member 3 that is adapted for connection to a fixed or swivelable mounting member (not shown). Each plate 2 is apertured to accommodate a shaft or axle 4 on which is rotatably journaled a wheel 5. The shaft 4 has a reduced end portion on which are mounted nuts 6, as is customary.

Also forming part of the support 1 is a pair of generally horizontal arms 7, one arm being welded or otherwise suitably fixed to one of the plates 2 and the other arm being similarly fixed to the second plate 2. At one end of each arm 7 is a horizontal, elongated slot 8. A similar slot 9 is provided at the opposite end of each arm 7.

The apparatus includes a pair of brake members generally designated 10 and 11 mounted at opposite ends of the arms 7. The brake member 10 comprises a generally arcuate shoe 12 having a curvature corresponding substantially to the curvature of the wheel 5. If desired, a brake lining material may be applied to the surface of the shoe 12 that is adapted to engage the wheel. To the outer surface of the shoe 12 are secured ears 13 through which extends a mounting pin 14. The width of the shoe 12 is such as to permit the latter to be accommodated between the arms 7, but the length of the pin 14 is such as to enable the latter to extend through and beyond both of the arms 7.

The brake member 11 is similar to the member 10 and comprises a shoe 15 from which extend ears or projections 16. Through the ears 16 extends a pin 17 which, like the pin 14, projects through and beyond both of the arms 7. The pin 17, however, is shorter than the pin 14 and does not project quite so far beyond the members 7 as does the pin 14.

The arrangement of the brake members 10 and 11 is such that they are located on diametrically opposite sides of the wheel 5 and are mounted, by means of the pins 14 and 17 and the slots 8 and 9, for linear movement into and out of engagement with the periphery of the wheel 5. The significance of this construction will be pointed out subsequently.

Means is provided for maintaining the brake members out of engagement with the wheel 5 and comprises a plurality of springs 18 which act on the brake members 10 and 11. Each spring 18 comprises a central loop 19 that receives a stud 20 mounted on one of the arms 7 and from which extends a pair of legs 21 having turned over feet 22 that bear against seats 23 formed in the shoe 12. Each spring 18 is so constructed that the feet 22 tend to move toward one another, thereby exerting a force on the shoe 12 or 15 tending to move it radially away from the wheel 5. Such movement of the brake shoe is limited by the engagement of the pin 14 with the radially outer end of the slot 8. The springs 18 are shown located at both ends of the arms 7 but could engage only the brake member 10 or only the shoe 15 and would still hold the other brake member out of engagement with the wheel.

Actuating mechanism designated generally by the reference character 24 is provided for effecting movement of the brake members 10 and 11 into and out of engagement with the wheel. The brake actuating mechanism 24 comprises a substantially U-shaped operating member 25 comprising a pair of parallel arms 26 connected together at corresponding ends by a crossbar 27. The free end of each arm 26 is apertured for pivotal reception of the pin 17. The operating member 25 therefore is rockable relatively to the brake member 11 about the axis of the pin 17 and is linearly movable with the brake member 11 toward and away from the periphery of the wheel 5.

Operating means 28 is provided for applying and releasing the brakes in response to rocking movement of the actuating member 25. The operating means comprises a pair of links 29 located one on either side of the support 1. One end of each link 29 is pivotally connected to the pin 14, and the other end of each link is pivotally connected to a stud 30 which projects laterally from the adjacent leg 26. The arrangement is such that the studs 30, and therefore the adjacent ends of the links 29, move in an orbital path about the axis of the pin 17 in response to rocking movement of the actuating member 25.

Preferably, each link 29 is composed of two parts 29a and 29b, the adjacent ends of which are threaded and are received in a correspondingly threaded turnbuckle 31. Adjustment of the turnbuckles 31 enables the length of the associated links 29 to be adjusted to compensate for pressure regulation of the tire.

When the apparatus is conditioned to permit rotation of the wheel 5, the brake members 10 and 11 are free of engagement with the wheel 5 and the actuating member 25 is in the position shown in FIGURE 1. In these positions of the parts, the springs 18 constantly exert a force on the brake members 10 and 11, holding the latter in a radially outer position as determined by the engagement between the pins 14 and 17 and the outer ends of the slots 8 and 9. Since the links 29 are connected to the pin 14, the links 29 also are urged in the direction of the brake member 10, causing the other ends of the links 29 to exert a force on the studs 30 to maintain the actuating member 25 in the inactive or raised position illustrated in FIGURE 1.

When it is desired to apply the brakes, the actuating member 25 is rocked clockwise, as viewed in FIGURE 1, about the axis of the pin 17 toward the position shown in FIGURE 4. As the actuating member moves toward the position shown in FIGURE 4, the studs 30 exert a force on the links 29 tending to move them to the right. Such movement of the links 29 is resisted by the springs 18. However, normally the spring force applied to shoes 12 and 15 is never quite equal so the resistance will vary vary slightly at the shoes 12 and 15. Consequently, at the end of links 20 where resistance is least, the pin 14 or the pin 17 is required to move inwardly, thereby effecting linear movement of the brake member 10 or 11 toward engagement with the wheel 5.

The length of the slots 8 or 9 is such that the brake shoe 12 or 15 will engage the periphery of the wheel 5 prior to the time the pin 14 or 17 engages the radially inner end of the slot 8 or 9. When the one shoe 12 or 15 is in engagement with the wheel 5 but exerting little more than a frictional drag on the wheel 5, further rocking of the actuating member 25 toward its brake applying position will result in the links 29 overcoming the force of the springs 18 to pull the other brake shoe 12 or 15 into engagement with the periphery of the wheel 5. If an assembly were built in which the forces to be overcome at shoes 12 and 15 were equal, the shoes would move together into engagement with the wheel simultaneously, but this precision is unnecessary. Only after both shoes are in engagement with the wheel is any appreciable clamping force applied to the wheel 5 with further downward movement of the lever 26 and this clamping force is applied equally by the brake members 12 and 15. When the two brake shoes 11 and 12 are exerting a substantial clamping force against the wheel at diametrically opposed positions, the rods 29 are in tension and twice the mechanical advantage is obtained.

Rocking movement of the actuating member 25 clockwise, as viewed in FIGURE 4, is limited by a pair of stops 32 and 33 formed on the arms 7 and on the arms 26, respectively. The members 32 and 33 are so arranged that, when the actuating member is in its brake applying position, the axis of the studs 30 is somewhat below the axis of the pin 17. When the brake actuating member 25 is moved into a position in which the stops 32 and 33 engage one another, that is, with the axis of the studs 30 slightly below the axis of the pin 17, the springs 18 will exert a force on the links 29 tending to rock actuating member 25 clockwise, as viewed in FIGURE 4. Such clockwise rotation will be prevented by the stops 32 and 33, but the force exerted by the springs 18 and the fact that the member 26 is slightly below a dead center position will prevent inadvertent release of the brakes.

When it is desired to release the brakes, the actuating member 25 is rocked counterclockwise from the position shown in FIGURE 4 to the position shown in FIGURE 1. As the actuating member 25 is rocked counterclockwise, the springs 18 move the brake members 10 and 11 radially away from the wheel 5 until the pins 14 and 17 engage the outer ends of the slots 8 and 9.

In FIGURE 5 we have shown a diagram which illustrates the forces which are applied to the system. If a single brake shoe 15 were used and the rod 29 were simply secured by means of a pin "b" to the fork 2, as in the construction shown in solid lines, the force "a" exerted on rod 29 once the shoe 15 was in tight engagement with the wheel 5 would be dissipated through the pin "b." However, in the present construction, by using the additional shoe 12 connected to the rod 29 (which is not pinned to the fork 2), the pull "a" is utilized and twice the braking capacity is achieved with the same applied force F.

The disclosed embodiment is representative of a presently preferred form of the invention, but is intended to be illustrative rather than definitive thereof. The invention is defined in the claims.

What is claimed is:

1. A brake construction for use with a rotatable member, said construction comprising first brake means; first mounting means mounting said first brake means for movement from a first position free of engagement with said rotatable member toward a second position in engagement therewith; second brake means; second mounting means mounting said second brake means for movement from a first position free of engagement with said rotatable member toward a second position in engagement therewith; actuating means supported on one of said mounting means for movement relative to the associated brake means from a brake releasing to a brake applying position and carried by said mounting means for movement with one of said brake means toward and away from said rotatable member; and means interconnecting said actuating means and the other of said brake means, said interconnecting means effecting movement of said first and second brake means toward their respective second positions in response to said movement of said actuating means.

2. A brake construction for use with a rotatable member, said construction comprising first brake means; first mounting means mounting said first brake means for movement from a first position free of engagement with said rotatable member toward a second position in engagement therewith; second brake means; second mounting means mounting said second brake means for movement from a first position free of engagement with said rotatable member toward a second position in engagement therewith; actuating means supported on one of said mounting means for movement relative to the associated brake means from a brake releasing to a brake applying position; rigid link operating means interconnecting said actuating means and the other of said brake means, said operating means effecting movement of said first and second brake means toward their respective second positions in response to said movement of said actuating means; and yieldable means constantly acting on at least one of said brake means and urging the latter toward its said first position.

3. A brake construction for use with a rotatable member, said construction comprising first brake means; first mounting means mounting said first brake means for movement from a first position free of engagement with said rotatable member toward a second position in engagement with said member; second brake means; second mounting means mounting said second brake means for movement from a first position free of engagement with said rotatable member toward a second position in engagement therewith; an actuating member rotatably mounted on one of said brake means for rotation relative thereto and for movement with said one of said brake means between its said first and second positions; and rigid operating means interconnecting said operating member and the other of said brake means, rotation of said actuating member in one direction effecting relative movement of said first and second brake means from their said first positions toward their said second positions.

4. The construction set forth in claim 3 wherein said operating means includes adjusting means for adjusting the length thereof.

5. A brake construction for use with a rotatable member, said construction comprising first brake means; first mounting means mounting said first brake means for movement from a first position free of engagement with said rotatable member toward a second position in engagement with said member; second brake means; second mounting means mounting said second brake means for movement from a first position free of engagement with said rotatable member toward a second position in engagement therewith; an actuating member rotatably mounted on one of said brake means for rotation relative thereto and for movement with said one of said brake means between its said first and second positions; rigid operating means interconnecting said actuating member and the other of said brake means, rotation of said actuating member in one direction effecting relative movement of said first and second brake means from their said first positions toward their said second positions before either can apply a substantial braking force; and yieldable means constantly acting on at least one of said brake means and urging the latter toward its said first position.

6. A wheel and brake assembly comprising a support; a wheel journaled on said support for rotation; a first brake member mounted on said support for linear movement into and out of engagement with said wheel; a second brake member mounted on said support for linear movement into and out of engagement with said wheel; brake actuating means rockably mounted on one of said brake members for movement relative thereto in one direction from a brake releasing position toward a brake applying position; and operating link means interconnecting said actuating means and the other of said brake members, said link means operating to exert a force on one of said brake members to move it towards said wheel in response to initial rocking movement of said actuating means toward its said applying position, and said link means operating to exert a force on the other of said brake members to move it toward said wheel in response to further rotation of said operating member toward its said brake applying position.

7. The assembly set forth in claim 6 wherein said brake members are mounted on substantially diametrically opposite sides of said wheel.

8. The assembly set forth in claim 6 including stop means in the path of rotation of said means for limiting rotation thereof in said one direction.

9. The assembly set forth in claim 6 including spring means acting on at least one of said brake members and urging the latter constantly away from said wheel.

10. A wheel and brake assembly comprising a support; a wheel journaled on said support; a first brake member; means mounting said first brake member on said support for linear movements toward and away from said engagement with said wheel; a second brake member; means mounting said second brake member on said support for linear movements toward and away from engagement with said wheel; a brake actuating member; means rotatably mounting said actuating member on one of said brake members whereby said actuating member is linearly movable with the latter and is rotatable relatively thereto about an axis; operating means; means connecting said operating means to the other of said brake members; and means pivotally connecting said operating means to said actuating member at a point on the latter which is movable in an orbital path about the axis of rotation of said actuating member.

11. The assembly set forth in claim 10 including stop means located in the path of movement of said actuating member for limiting movement of the latter in one direction about said axis.

12. The assembly set forth in claim 10 wherein the length of said operating means from its connection to said one of said brake members to said point on said actuating member is greater than the distance between the mounting means for said brake members.

13. A wheel and brake assembly comprising a support; a wheel; means journaling said wheel on said support; a first brake member; a second brake member diametrically opposed from said first brake member; cooperable pin and slot mounting means on said support and on each of said brake members mounting the latter for linear movements into and out of engagement with said wheel; an actuating member pivotally mounted on one of said brake members for swinging movement about an axis; and a rigid link connected at one of its ends to the other of said brake members and at its other end to said operating member at a point spaced from said axis, the length of said link between its connections to said other brake member and to said actuating member being greater than the distance between the pin and slot mounting means of the respective brake members.

14. The assembly set forth in claim 13 including spring means acting between said support and at least one of said brake members for constantly urging the latter in a direction out of engagement with said wheel.

15. The assembly set forth in claim 13 including stop means on said support in the path of swinging movement of said actuating member for limiting said movement thereof only after said actuating member has swung down below a dead center position with respect to said link.

16. A brake construction for use with a rotatable member including: first brake means; second brake means; means mounting said first and second brake means on opposite sides of said rotatable member for movement from a first position free of engagement with said member to a second position in engagement with said member; actuating means movable through a path of movement; means connecting said actuating means and one of said brake means for moving the latter from its first position toward its said second position during a portion of the path of movement of the actuating means; and means connecting said actuating means to the other of said brake means for moving the latter from its said first position toward its said second position before the said first brake means has exerted an appreciable clamping force on said rotatable member; said actuating means, during a remaining portion of its path of movement and only after both brake means are in engagement with said rotatable member, causing both brake means to exert an appreciable clamping force on said rotatable member.

17. A relative movement restraining construction for use with a rotatable member, said construction comprising first and second brake means, each mounted for movement from a first position free of engagement with said rotatable member toward a second position in engagement therewith; actuating means supported on one of said brake means for movement from a brake releasing to a brake applying position and carried by said brake means for movement with said brake means toward and away from said rotatable member; and means interconnecting said actuating means and the other of said brake means, said interconnecting means effecting movement of said first and second brake means toward their respective second positions in response to said movement of said actuating means.

References Cited by the Examiner

UNITED STATES PATENTS

| | | | |
|---|---|---|---|
| 568,959 | 10/1896 | Ruthenberg | 188—56 |
| 2,045,179 | 6/1936 | Doring | 188—75 |
| 2,572,548 | 10/1951 | Weisz et al. | 16—35 |
| 2,900,050 | 8/1959 | Baker | 188—75 X |

DUANE A. REGER, *Primary Examiner.*